Figure 1:
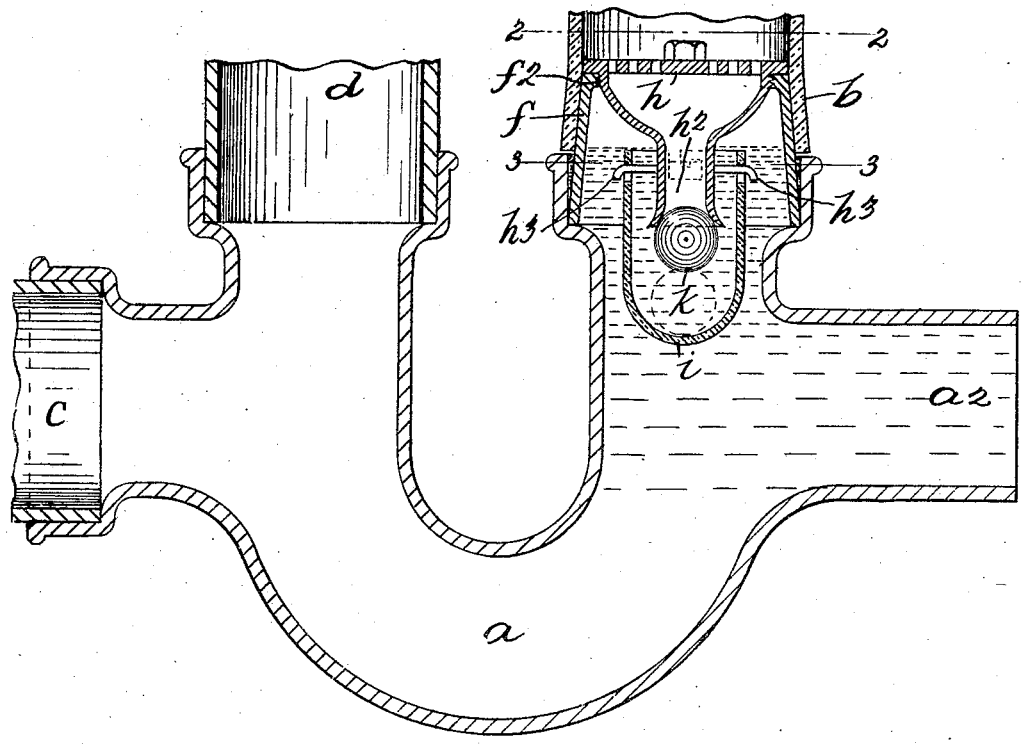

No. 880,975. PATENTED MAR. 3, 1908.
E. A. & F. M. CONRAD.
WATER TRAP AND SEAL.
APPLICATION FILED DEC. 31, 1906.

WITNESSES:
M. M. Whipple
Adam Bee

INVENTORS
Edward A. Conrad
Frank M. Conrad
BY
J. Chris Larsen
ATTORNEY

THE NORRIS PETERS CO., WASHINGTON, D. C.

UNITED STATES PATENT OFFICE.

EDWARD A. CONRAD AND FRANK M. CONRAD, OF ELIZABETH, NEW JERSEY.

WATER TRAP AND SEAL.

No. 880,975.     Specification of Letters Patent.     Patented March 3, 1908.

Application filed December 31, 1906. Serial No. 350,297.

*To all whom it may concern:*

Be it known that we, EDWARD A. CONRAD and FRANK M. CONRAD, citizens of the United States of America, and residing at Elizabeth, in the county of Union and State of New Jersey, have invented certain new and useful Improvements in Water Traps and Seals, of which the following is a specification, such as will enable those skilled in the art to which it appertains to make and use the same.

This invention relates to back water traps for use in connection with house plumbing, such as sewer traps, cellar drains and the like and the object thereof is to provide such a trap which prevents water which has once passed therethrough from returning into the pipe from which it came; a further object being to provide a trap of this character which is also an effectual seal, thereby preventing gases from passing therethrough and into the building in which it is located; a further object being to provide such a device wherein the parts are accessible and interchangeable and which is very simple in construction, easy to place in position, absolutely effectual and comparatively inexpensive.

Our invention is fully described in the following specification, of which the accompanying drawings form a part, in which the separate parts are designated by suitable reference characters in each of the views, and in which:—

Figure 2:
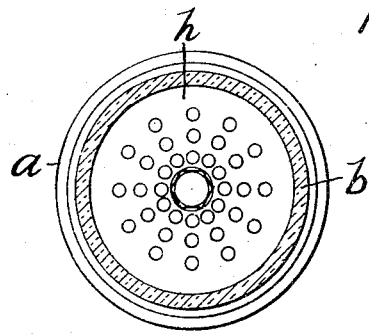
Figure 3:
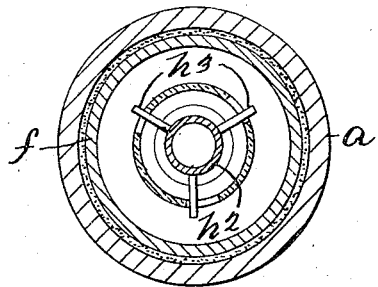

Figure 1 is a sectional view of an ordinary trap with our invention in position in the drain pipe; Fig. 2 is a sectional view taken on the line 2—2 of Fig. 1; and Fig. 3 is a sectional view taken on the line 3—3 of Fig. 1.

In the drawings forming a part of this application we have shown an ordinary trap $a$ provided with a house drain pipe $b$, a cellar drain pipe $c$ and the sewer outlet $a^2$ and in the drawing we also show another pipe $d$ which may or may not be employed but which may also be provided with our invention if desired.

In the drain pipe $b$ we have shown our invention ready for use and in position for preventing back water and also for preventing the passage of gases therethrough, said invention consisting of an inclined collar $f$ calked into the trap $a$ and the drain pipe $b$ is also calked or otherwise secured to the said collar, hermetically Connected with the collar $f$, by means of a screw-thread $f^2$ is a perforated plate $h$ to which is secured a dependent tube $h^2$, the bottom of which is flared outwardly as shown and provided with arms $h^3$ upon which is mounted, by means of an ordinary bayonet joint, a cup $i$ in which is loosely placed a spherical float $k$ which is adapted to close the flared end of the tube $h^2$ when in use and it will be seen that the top of the cup $i$ projects a considerable distance beyond the bottom of the tube $h^2$.

In practice, the water from the pipe $b$ passes through the plate $h$ and tube $h^2$ into the cup $i$ and thence into the trap $a$ and to the sewer and the float $k$ is raised by the water in the cup $i$ finding a seat in the flared end of the tube $h^2$ thereby preventing the water passing into the said tube and also effectually preventing the passage of gases from the sewer thereinto, not alone because of the float, however, but also because of the water in the cup $i$ which completely closes the mouth of the tube $h^2$, thereby forming a water seal for the pipe $b$.

It will be observed that the float does not prevent the outward passage of the water from the pipe $b$ and ready access to the cup $i$ is possible, either for substitution or repair and various changes in and modifications of the construction shown and described may be made, within the scope of the following claims, without departing from the spirit of our invention or sacrificing its advantages.

Having fully described our invention, what we claim as new and desire to secure by Letters Patent, is:—

In a trap, a collar secured in the drain pipe flange and in said drain pipe, a passage through said collar, a cup detachably mounted upon said passage and a float in said cup, normally above the level of water in said trap and preventing communication between said trap and said drain pipe.

In testimony that we claim the foregoing as our invention we have signed our names in presence of the subscribing witnesses this 28th day of December 1906.

EDWARD A. CONRAD.
              FRANK M. CONRAD.

Witnesses:
   A. J. MONLAW,
   M. M. WHIPPLE.